(12) United States Patent
Wiman et al.

(10) Patent No.: US 6,715,967 B2
(45) Date of Patent: Apr. 6, 2004

(54) CUTTING INSERT FOR CHIP REMOVING MACHINING (75) Inventors: Jörgen Wiman, Sandviken (SE); Ronnie Löf, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 10/259,307

(22) Filed: Sep. 30, 2002

(65) Prior Publication Data

US 2003/0086767 A1 May 8, 2003

(30) Foreign Application Priority Data

Oct. 1, 2001 (SE) .............................................. 0103255

(51) Int. Cl.[7] .............................. B26D 1/00; B23B 27/16
(52) U.S. Cl. ...................... 407/114; 407/113; 407/115; 407/116
(58) Field of Search ................................. 407/114, 115, 407/113, 116, 33, 34, 35

(56) References Cited

U.S. PATENT DOCUMENTS

| | | | |
|---|---|---|---|
| 3,973,307 A | | 8/1976 | McCreery et al. |
| 4,044,439 A | | 8/1977 | Romagnolo |
| 4,087,193 A | * | 5/1978 | Mundy ........................ 407/114 |
| 4,124,326 A | | 11/1978 | Cost |
| 4,259,033 A | | 3/1981 | McCreery et al. |
| 4,340,324 A | | 7/1982 | McCreery |
| 4,479,744 A | * | 10/1984 | Stricker ........................ 407/114 |
| 4,681,488 A | | 7/1987 | Markusson |
| RE32,636 E | * | 4/1988 | Stashko ........................ 407/114 |
| 4,880,338 A | | 11/1989 | Stashko |
| 5,122,017 A | | 6/1992 | Niebauer |
| 5,226,761 A | | 7/1993 | Satran et al. |
| 5,634,745 A | | 6/1997 | Wiman et al. |
| 5,743,681 A | | 4/1998 | Wiman et al. |
| 5,788,427 A | | 8/1998 | Zitzlaff et al. |
| 6,217,263 B1 | | 4/2001 | Wiman et al. |
| 6,244,791 B1 | | 6/2001 | Wiman et al. |

FOREIGN PATENT DOCUMENTS

| | | |
|---|---|---|
| DE | 43 09 897 | 8/1994 |
| GB | 2 035 859 | 6/1980 |
| GB | 2 093 379 | 9/1982 |
| JP | 07-308807 | 11/1995 |
| SU | 1 782 196 | 12/1992 |
| WO | WO 95/00272 | 1/1995 |
| WO | WO 00/21704 | 4/2000 |

* cited by examiner

Primary Examiner—Willmon Fridie, Jr.
(74) Attorney, Agent, or Firm—Burns, Doane, Swecker & Mathis, LLP

(57) ABSTRACT

A cutting insert, intended for chip removing machining includes a cutting geometry surface having a cutting edge from which extends a primary chamfer that transforms into a chip removing surface. The chip removing surface is inclined in a inwards/downwards direction in order to permit sinking of a chip being formed, and transforms into a deflection surface arranged to initiate deflection of the chip from the cutting insert. The angle of inclination of the chip removing surface does not exceed 18°. The level difference in elevation between the primary chamfer and the chip deflection surface amounts to maximally 0.20 mm.

17 Claims, 6 Drawing Sheets

CUTTING INSERT FOR CHIP REMOVING MACHINING

RELATED INVENTIONS

This invention is related to that disclosed in application Ser. No. 10/259,383 filed on Sep. 30, 2002.

This application claims priority under 35 U.S.C. §119 to patent application Ser. No. 0103255-6 filed in Sweden on Oct. 1, 2001, the entire content of which is hereby incorporated by reference.

BACKGROUND OF THE INVENTION

This invention relates to a cutting insert, intended for chip removing machining, of the type that comprises a body that is delimited by on one hand two opposite, first and second surfaces, which in the operative state of the cutting insert form an actively chip removing top surface and an inactive bottom surface, respectively, and on the other hand at least one side surface serving as a flank surface, which extends between said first and second surfaces. A cutting edge is formed between the flank surface and at least one of said first and second surfaces, in connection with which a cutting geometry surface extends, which is generally parallel to an imaginary reference plane through the cutting body. The cutting geometry surface, counted from the cutting edge, includes a primary chamfer which transforms into a chip removing surface, which is inclined in the direction inwards/downwards in order to permit sinking of a chip being under formation, and which transforms into a deflection surface arranged to be met by the chip and at least initiate deflection or guiding away of the same from the cutting insert.

If the cutting insert is single-sided, there is a cutting geometry surface present merely on the top side of the body, while the bottom side has a plane support surface. If the cutting insert is double-sided, such cutting geometry surfaces are present at the top as well as at the bottom of the cutting insert.

Cutting inserts of the above generally mentioned kind may be of a round (circular or oval) as well as a polygonal basic shape. In the last-mentioned case, the cutting body is defined by at least three (usually plane or slightly curved) side surfaces or flank surfaces that extend between said first and second surfaces, whereby nearby flank surfaces transform into each other via a convexly rounded nose to which at least one cutting edge connects, which is divided in a plurality of segments having different radii, viz. a first edge segment in immediate vicinity of the actual nose, a second edge segment that is located on one side of the nose, a third edge segment, located on the opposite side of the nose, which is arranged to release at a certain clearance angle from a machined surface on the workpiece, as well as a fourth edge segment located between the first and third edge segments, that fulfils the purpose of smoothening and facing the machined surface of the workpiece.

PRIOR ART

Cutting inserts of the kind in question, that constitute replaceable wearing parts and are detachably mounted in different kinds of holders for cutting tools, may be used industrially for highly varying purposes, such as milling, drilling, broaching, turning and the like. The workpieces that are machined usually consist of metal, whereby the cutting inserts are made from a hard, hardwearing material, such as cemented carbide, silicon nitride, aluminum oxide, etc., while the holders of the tools are made from a more elastic material, in particular steel.

In previously known cutting inserts, the "topography" of the cutting geometry surface, i.e., the elevation differences between the highest and lowest located points, respectively, of the cutting geometry surface have been coarse or markedly undulating, on one hand so far that the angle of inclination of the chip removing surface in connection with the primary chamfer of the edge has been comparatively large (approx. 20° or more), and on the other hand so far that the elevation difference between different tumblings or ridges having a chip breaking or steering function and valleys or bottoms situated deepest of the cutting geometry surface have amounted to measures being considerable in this context (0.5 mm or more). In said tumblings and ridges, respectively, protruding high up from the bottom regions of the cutting geometry surface, heat concentrations occur, which inter alia lead to crack formations in the cutting insert, and thereby shortening the service life thereof.

For one of the above-mentioned fields of application, viz. turning, the interaction between the feeding of the cutting insert and the design of the cutting edge is of great importance for several aspects of the operation outcome. Generally, a nose having the largest possible radius should be chosen at rough turning, with the purpose of achieving a strong cutting edge. However, too large a nose radius may cause vibrations and detrimental generation of heat. Therefore, at smooth turning, a smaller nose radius is advantageously selected; usually smaller than 2 mm. A disadvantage of a small nose radius, however, is that the wear of the cutting insert is hastened, whereby the service life and performance thereof are deteriorated.

Another factor that is affected by the interaction between the nose radius and the feeding is the surface finish of the rotary workpiece. Particularly important in this respect is the surface smoothening edge segment that is present on at least one of the sides of the actual nose or on both sides of the nose. Investigations that form the basis of the present invention have shown that the so-called tangent point of the smoothening edge segment has a particularly great importance for the surface finish. This tangent point is the geometrical point along the smoothening edge In previously known turning inserts, (see, for instance, Publication WO 95/00272; U.S. Pat. No. 6,217,263; U.S. Pat. No. 5,226,761; Swedish Applications SE-9401732-4; SE-9702501-9 and Russian Document SU-1782196) the surface smoothening edge segment is usually arched and extends as a continuous line between on one hand, the point where this edge segment directly or indirectly transforms into the nose edge itself and on the other hand, the point where the same directly or indirectly transforms into the edge segment that releases at a certain clearance angle from the machined surface of the workpiece. In practice, the length of the surface smoothening edge segment should substantially be equally large as the feeding, i.e., the axial distance that the cutting insert covers during one revolution of rotation of the workpiece.

An annoying circumstance in regards of the surface finish in previously known cutting inserts is that the position of the actual tangent point along the surface smoothening edge segment has not been able to be predetermined in a reliable way. Thus, the actual tangent point may drift in an uncontrollable way between the two opposite ends of the edge segment and in this connection give rise to varying surface finish.

In order to guarantee an acceptable surface finish, the feeding has in previously known cutting inserts been limited to maximally 0.6 or 0.7 mm/rev. Theoretically, it is feasible, per se, to enable high feedings with straight smoothening edge segments, but in practice this way is objectionable so far that straight edge segments with a smoothening function involves large radial cutting forces with the ensuing risk of vibrations and high generation of heat.

Aims and Features of the Invention

The present invention aims at obviating the above-mentioned disadvantages of previously known cutting inserts and at providing an improved cutting insert. Therefore, a primary aim of the invention in a first aspect is to improve the cutting geometry surface adjacent to the operatively active cutting edge of the cutting insert, more precisely with the purpose of minimizing the risk of heat concentrations and crack formations in the material in the surface zone of the cutting insert. Another aim of the invention is to provide a cutting insert that generally guarantees an improved surface finish of the machined surface of a workpiece. In the embodiment thereof as turning insert, this possibility should for instance be utilized for radically increased feeding with a retained or even improved surface finish. In an analogous way, the invention should be able to be utilized for general performance increase of cutting inserts having a surface smoothening edge segment also for other machining techniques than just turning, such as milling, drilling, broaching or the like.

At least the primary aim of the invention is attained by a cutting insert for chip removing machining of work pieces. The insert comprises a body having opposite first and second surfaces interconnected by at least one side surface. When the insert is in an operative cutting state, the first and second surfaces form a chip removing top flank surface and an inactive bottom flank surface, respectively. The top flank surface forms a cutting edge with the side surfaces. A cutting geometry surface extends from the cutting edge and includes a primary chamfer extending from the cutting edge and transforming into a chip removing surface. The chip removing surface is inclined in a downwards and inwards direction and transforms into a chip deflection surface for initiating deflection of a chip. The chip deflecting surface forms an angle with a center reference plane extending parallel to the top and bottom surfaces, the angle being no greater than 18°. A difference in elevation between the chip deflection surface and a highest point of the primary chamfer being no greater than 0.20 mm.

DESCRIPTION OF THE DRAWINGS

The objects and advantages of the invention will become apparent from the following detailed description of preferred embodiments thereof in connection with the accompanying drawings in which like numerals designate like elements and in which.

DESCRIPTION OF PREFERRED
EMBODIMENTS OF THE INVENTION

Figure 1:
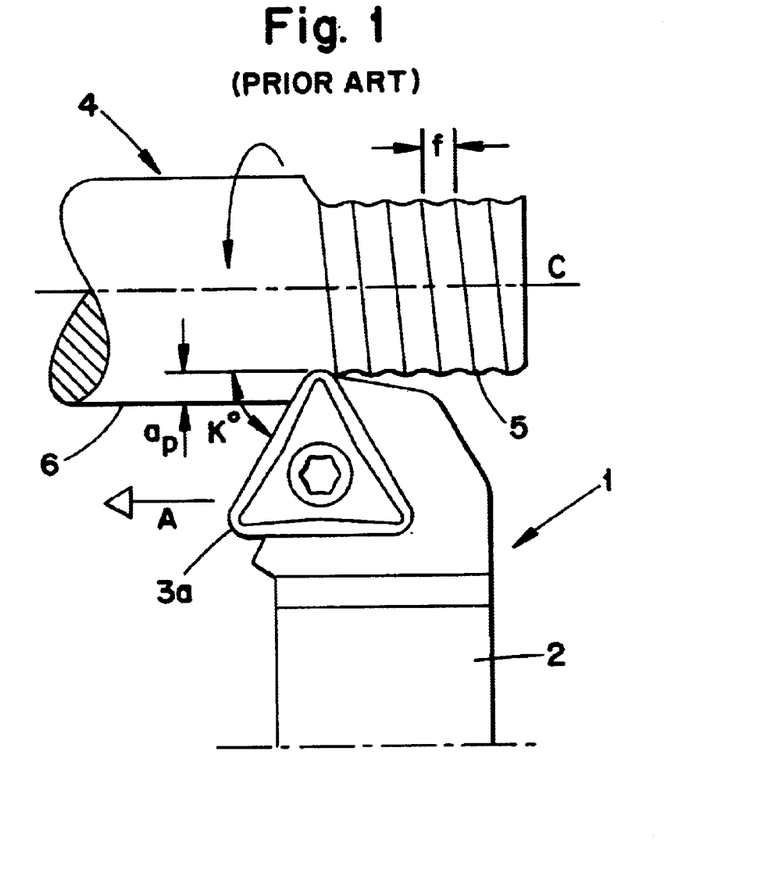
FIG. 1 is a schematic illustration of the general principle of longitudinal turning.

In FIG. 1, a turning tool is shown schematically during machining of a workpiece. The machining in this case consists of longitudinal turning. The tool is in its entirety designated 1 and includes a bar or holder 2, as well as a replaceable cutting insert 3a. The workpiece 4 rotatable around a geometric axis C. A machined, cylindrical surface 5 on the workpiece typically has wave formations shown in drastically exaggerated scale in FIG. 1, which detract from the surface finish. The distance between the tops of these wave formations is a function of the feeding f of the cutting insert 3a, which is measured in mm/revolution. Furthermore, $a_p$ designates the cutting depth that constitutes the radial difference between the machined surface 5 and the unmachined surface 6 as measured perpendicularly to the feeding direction of the tool (see the arrow A). The side angle K° is the angle between the main cutting edge and the feeding direction of the cutting insert.

Figure 2:
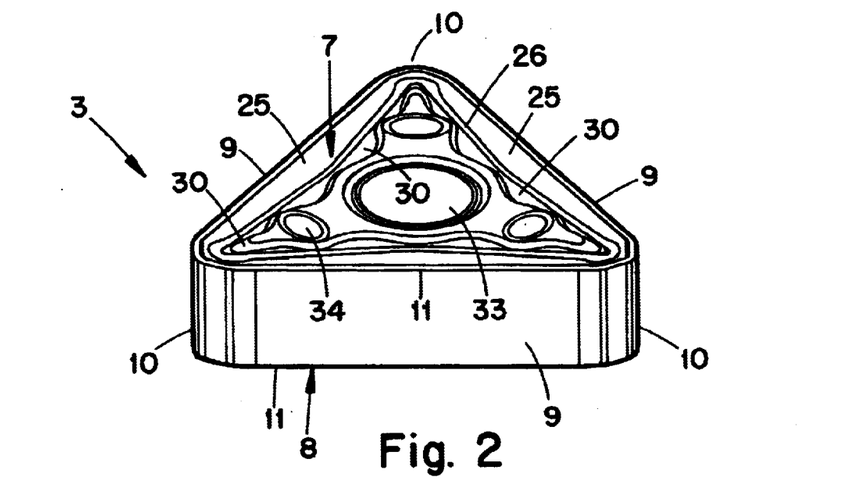
FIG. 2 is a perspective view of a polygonal, particularly triangular cutting insert according to the invention.

Reference is now made to FIG. 2, which illustrates a cutting insert 3 according to the invention. The cutting insert in this case consists of a body having a polygonal, more precisely triangular basic shape, that is delimited by two opposite, first and second surfaces 7, 8, as well as three side surfaces 9 serving as a flank surfaces. In the operative state of the cutting insert, i.e., during turning, the upwardly turned first surface 7 forms an active chip removing top surface, while the opposite lower surface 8 is inactive. The active chip removing surface 7 furthermore constitutes a cutting geometry surface having a unique, new design. If the cutting insert is single-sided, the surface 8 serves merely as a support surface having substantially plane shape. In double-sided cutting inserts, both surfaces 7, 8 are formed as cutting geometry surfaces.

Nearby flank surfaces 9 transform into each other via curved corners which include respective convexly rounded noses, generally designated 10. Between the upper cutting geometry surface 7 and the flank surfaces 9, a continuous cutting edge 11 is formed. In each corner, the cutting edge is divided into a plurality of segments having different radii as discussed below. The different segments of the edge are effected through convenient shaping of part surfaces with a different curvature, as clearly is shown along the flank surface 9 in the area of the noses 10 in FIG. 2. The formation of these curved part surfaces may be effected through grinding, direct pressing, injection molding or in other ways.

Figure 3:
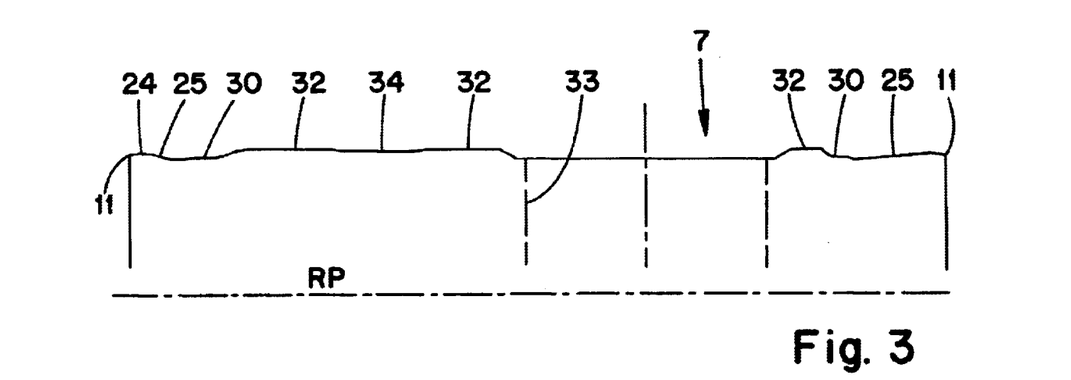
FIG. 3 is an enlarged section through a cutting geometry surface, visible from above, on the cutting insert according to FIG. 2, whereby the section extends in a bisector-like way through a hole in the cutting insert, as well as through a corner of the same.
Figure 4:
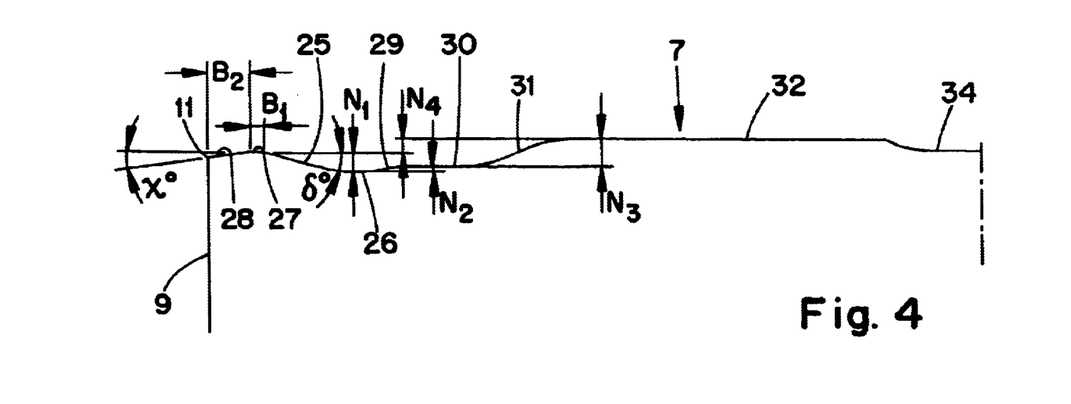
FIG. 4 is an additionally enlarged partial section of the cutting geometry surface in FIG. 3.

Reference is now made to FIGS. 3 and 4, which in enlargement illustrate the "topographical" design of the cutting geometry surface 7 of the cutting insert according to FIG. 2.

In this case, the cutting insert is meant to be double-sided, whereby the two opposite surfaces 7, 8, between which the flank surfaces 9 extend, are of an identical shape. This means that also the surface 8 has a cutting edge 11 that may be utilized for chip removing machining if the surface 8 is turned upwards in the operative state of the cutting insert. The continuing disclosure of the design of the cutting geometry surface is, however, carried out with reference being made merely to the surface 7 as this is shown in FIGS. 3 and 4.

Generally, the surface 7 is parallel to an imaginary center reference plane RP which in cutting inserts of a uniform thickness may consist of a central plane halfway between the surfaces 7 and 8 and parallel thereto.

Counted inwardly from the cutting edge 11, the illustrated cutting geometry surface includes a primary chamfer, in its entirety designated 24, and a chip removing surface 25, which is inclined in the direction inwards/downwards in order to enable sinking of a chip being under formation. Said surface 25 transforms into a deflection surface designated 26, which is arranged to be met by the chip and at least initiate deflection or guiding away of the same from the cutting insert. In the shown example, the primary chamfer 24 is composed of two part surfaces, viz. a comparatively narrow chamfer surface 27 and a wider, negative chamfer surface 28 that extends at an obtuse angle to the chamfer surface 27 as well as the flank surface 9. The chamfer surface 27 is parallel to the reference plane RP, whereby the angle (between the negative chamfer surface 28 and an imaginary plane in the extension of the chamfer surface 27 may amount to 7° or thereabout. The chamfer surface 27 may have a width $B_1$ of 0.1 mm, while the width $B_2$ of the chamfer surface 28 may be in the range of 0.2–0.6 mm, preferably 0.3–0.5 mm.

In the shown example, the deflection surface 26 forms a lowermost located bottom surface that via a concavely curved chip breaking surface 29 transforms into a plane land 30. Via a second transition surface 31, said first land 30 transforms into a second land 32, which surrounds the central hole 33 in the cutting insert (see FIG. 2). In the land 32, individual countersinks 34 are formed.

The angle of inclination (of the chip removing surface 25 in relation to the reference plane has in the previously known cutting inserts amounted to more than approx. 20° (usually at least 22°), in addition to which, the depth of the deflection surface 26, i.e. the level or elevation difference $N_1$ between the surface 26 and an imaginary plane parallel to the reference plane, in extension of the chamfer surface 27, has amounted to 0.5 mm or more.

In the cutting insert according to the present invention, the angle δ is within the range of 3–18°, conveniently 10–15°. In the example according to FIGS. 2–4, the angle δ amounts to 14°. Furthermore, the elevation difference $N_1$ between the chamfer surface 27 of the primary chamfer that is situated highest and the chip deflection surface 26 amounts to maximally 0.20 mm. It is to advantage if said elevation difference amounts to a measure within the range of 0.06–0.14 mm, preferably 0.090–0.125 mm. The elevation difference $N_2$ between the deflection surface 26, formed defining a bottom, and the first land 30 may be within the range of 0.02–0.06 mm and advantageously amount to 0.04 mm.

The elevation difference between the bottom surface 26 and the second land 32 should, in double-sided cutting inserts, always be greater than the elevation difference $N_1$ between the surface 26 and chamfer surface 27. In this way, the land 32 will protrude somewhat in relation to an imaginary plane, parallel to the reference plane RP extending through the chamfer surface 27. In other words, the land 32 may serve as a lower support surface against a cutting seat surface without the primary chamfer 24 and the edge 11 getting into contact with the cutting seat surface. In practice, said elevation difference should be at least 0.05 mm greater than the elevation difference $N_1$.

In the concrete embodiment example according to FIGS. 2–4, the elevation difference $N_1$ amounts to 0.13 mm, $N_2$ to 0.04 mm and $N_3$ (between the lands 30 and 32) to 0.19 mm. In other words, the elevation difference $N_4$ between the land 32 and the chamfer surface 27 amounts to 0.10 mm.

The above-described geometry is present in the area of each individual nose 10 (see FIG. 2). At each straight cutting edge and flank surface, respectively, which is situated diametrically opposite a nose 10 (i.e. which extends perpendicularly to an imaginary nose bisector through the center of the hole 33), the geometry is somewhat different. More precisely, the angle of inclination (of the chip removing surface 25 is here considerably smaller (see to the right in FIG. 3). Instead of 14°, this angle may be as small as 5°. In other words, the chip removing surface 25 extends at a considerably flatter angle in the area of the center thereof than further out towards the individual nose.

Furthermore, as is seen in the perspective image in FIG. 2, the disclosed cutting geometry surface 7 lacks every form of abruptly protruding tumblings or projections, in that the two lands 30, 32 consist of plane surfaces, the first-mentioned one 30 of which is situated very near the bottom surface 26 located deepest, and the second one of which 32 protrudes merely 0.10 mm above the plane of the primary chamfer of the edge, particularly the chamfer surface 27. Thanks to the moderate angles of inclination (the angle δ at the noses and at the center of the straight edge portion, respectively), the elevation difference between the bottom surface 26 and the chamfer surface 27 of the primary chamfer becomes very limited. More precisely, this elevation difference should never exceed 0.20 mm. The effect of this shallow and flat cutting geometry is that the heat that is generated in connection with the separation of chips from the workpiece is distributed and absorbed evenly along the different part surfaces which together form the cutting geometry surface of the cutting insert. In other words, the emergence of heat concentrations to individual projections, spaced-apart point by point on the cutting geometry surface, is avoided, which in turn efficiently counteracts the risk of crack formations in the material of the cutting insert.

Reference is now made to FIGS. 10–14, which illustrate a single-sided cutting insert. In this case, the chamfer surface 27 of the primary chamfer 24 constitutes the highest located part of the cutting geometry surface 7. In the section cuts A—A, B—B, C—C (FIGS. 12–14, respectively), a chip removing surface 25 extends, which is inclined at an angle δ that in all section cuts may amount to 140. Via a transition surface 35 having a radius R of, e.g., 1 mm, the chip removing surface 25 transforms into a chip deflection surface 26', which in this embodiment is in the form of a plane land. In the section cuts A—A and C—C, this land 26' transforms into a deepest located bottom surface 36 closer to the center of the cutting insert.

Figures 12, 13, 14:
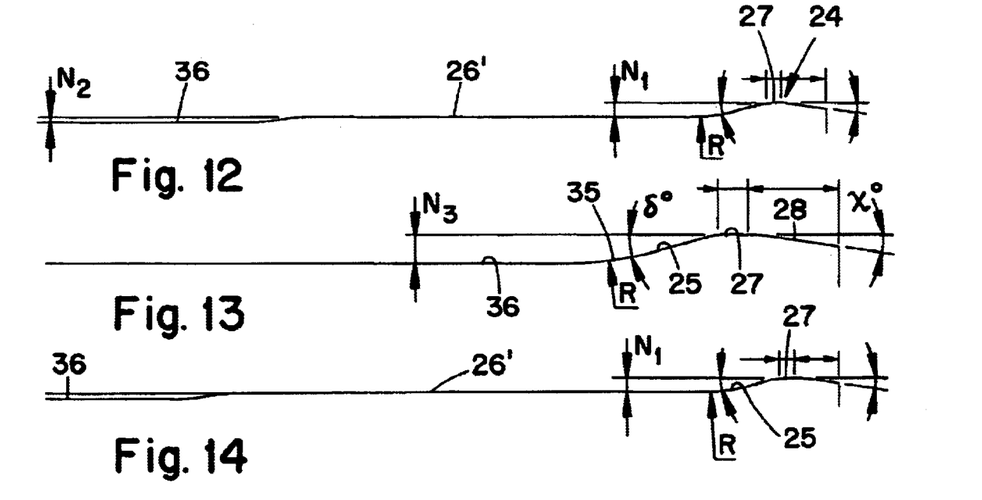
FIG. 12 is an enlargement of the section A—A.
FIG. 13 is an enlargement of the section B—B.
FIG. 14 is an enlargement of the section C—C.

The elevation difference $N_1$ between the chamfer surface 27 and the chip deflection surface 26' may amount to 0.090 mm, whereby the elevation difference $N_2$ between the chip deflection surface 26' and a bottom surface 36, situated deepest in the cutting geometry surface, amounts to 0.035 mm. This means that the total elevation difference $N_3$ between the surfaces 27, 36 located highest and lowermost of the cutting geometry surface amounts to merely 0.125 mm. Also in this case, the chamfer angle X may amount to 7°.

Figure 5:
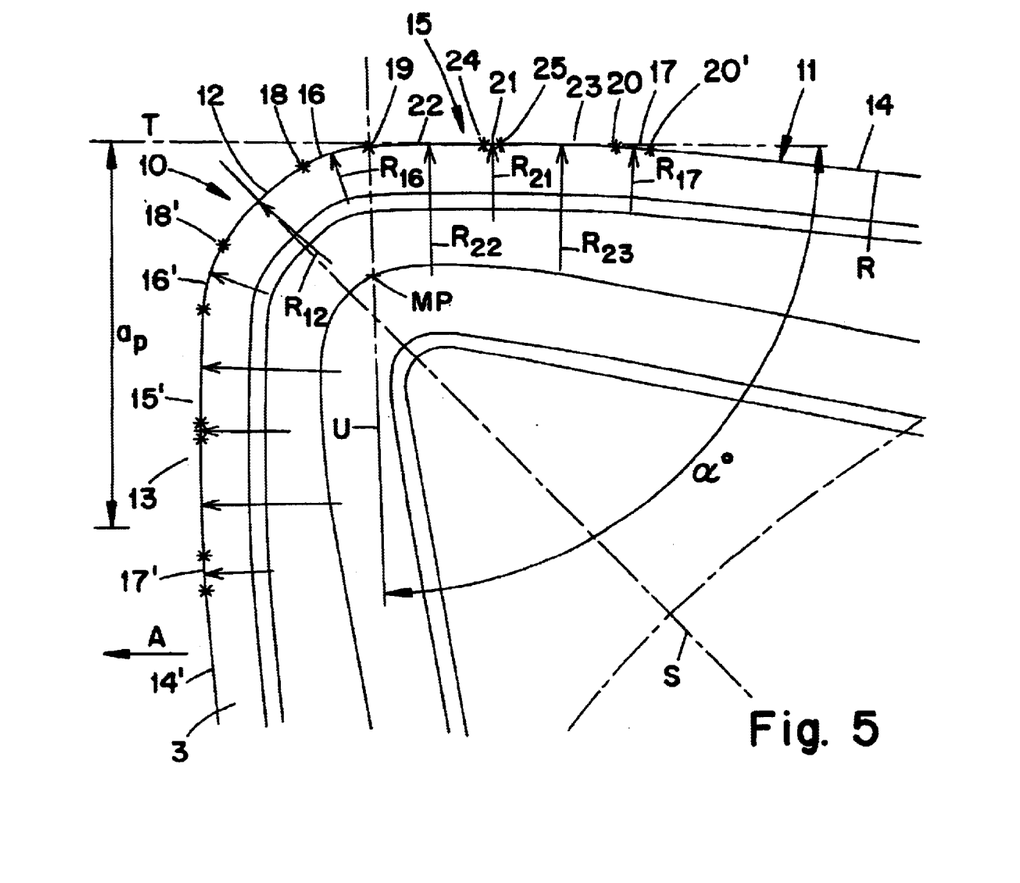
FIG. 5 is an extremely enlarged, partial view from above of a nose to a cutting insert, made in accordance with the invention.
Figure 6:
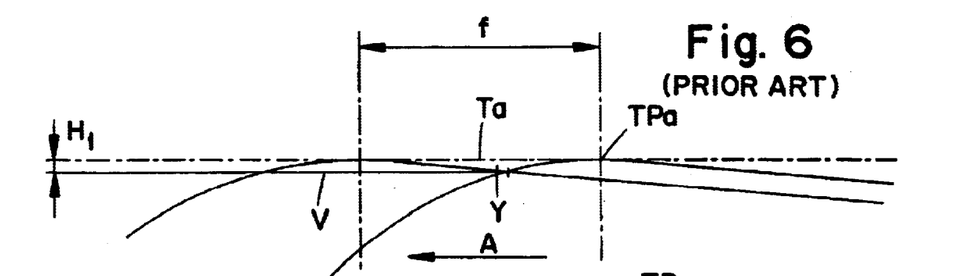
FIG. 6 is a schematic illustration of the motion pattern of the tangent point on a surface smoothening edge segment of a cutting insert according to prior art.
Figure 7:
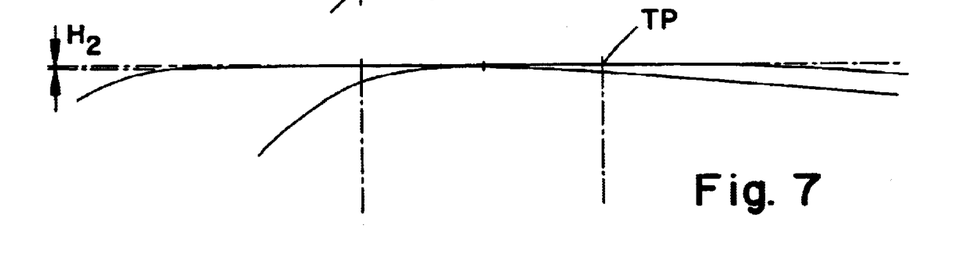
FIG. 7 is an analogous illustration showing the motion pattern of the tangent point at a cutting insert according to the present invention.

Reference is now made to FIGS. 5–7, which illustrate additional preferred features of the cutting insert according to the invention. In FIG. 5, a symmetrically formed nose is exemplified, the different edge segments of which on both sides of a bisector or symmetry line S have identical shape. The symmetry line S extends at an acute angle (approximately 45°) to an imaginary tangent line T that is parallel to the rotation axis C of the workpiece. The tangent line T is also tangent to a part edge segment 21 of the insert. The edge 11, active in the operative state, is divided into a plurality of segments having different radii, viz. a first edge segment 12 in the immediate vicinity of the actual nose 10, a second edge segment 13 that is located on one side of the nose or symmetry line S, a third edge segment 14 located on the opposite side of the nose, which third edge segment is arranged to release at a certain clearance angle from the machined surface 5 of the workpiece, as well as a fourth edge segment 15, located between the first and third edge segments 12, 14, which has the purpose of smoothening or facing the machined surface of the workpiece. In this connection, it should be pointed out that the cutting insert 3 in FIG. 5 is meant to move from the right to the left in the same way as in FIG. 1. In other words, the cutting insert is fed in the direction of the arrow A, whereby a feasible cutting depth is indicated at $a_p$.

In this case, a transition edge segment 16 extends between the nose edge segment 12 and the surface smoothening edge segment 15. Another transition segment 17 extends between the surface smoothening edge segment 15 and the third edge segment 14.

The different edge segments extend between end points, which for the sake of clarity are in the form of enlarged stars. Thus, the first edge segment 12 extends between end points 18, 18', while the surface smoothening, fourth edge segment 15 extends between end points 19, 20. The third edge segment 14 extends from an end point 20' and towards the right in FIG. 5. In the symmetrical embodiment that is exemplified in FIG. 5, the second edge segment designated 13 extends downwards from the point 18', and has a shape that is determined by edge segments 16', 15', 17' and 14' (which have their equivalents on the opposite side of the symmetry line S). Thus, at the feeding direction A, the edge segment 13 performs the principal chip removing machining, while the edge segment 15 is surface smoothening. However, thanks to the symmetrical design of the nose, the cutting insert may also be used in a mirror-inverted way, whereby the edge segment 15' becomes surface smoothening.

The radius of the edge segment 12 is designated $R_{12}$. In an analogous way, the radius of the edge segment 16 is designated $R_{16}$ and the radii of the edge segments 17 and 14, are designated $R_{17}$ and $R_{14}$, respectively. In this connection, it should be pointed out that the edge segment 14 may be straight, whereby the radius $R_{14}$ is infinity.

In previously known cutting inserts having arched or convex surface smoothening edge segments 15, said edge segment has continuously extended as a line between the end points 19, 20 thereof. Contrary to this, the edge segment 15 according to the present invention is divided into at least three different part edge segments, the first one 21 of which, having a certain radius $R_{21}$, is surrounded by two part edge segments 22, 23 having greater radii $R_{22}$ and $R_{23}$, respectively. The first part edge segment 21 extends between end points 24, 25 which are located comparatively near each other. In other words, the part edge segment 21 is comparatively short. Thus, in practice, the length of the first part edge segment 21 may amount to 1–15%, conveniently 5–10% of the total length of the fourth edge segment 15 between the points 19, 20.

According to a preferred embodiment of the invention, the second and third part edge segments 22, 23 should have a radius that is at least 3 and preferably 5–10 times greater than the radius of the first part edge segment 21. The radii $R_{22}$, $R_{23}$ may either be equally large or of different sizes. However, it is to advantage if the second and third part edge segments 22, 23 are equally long. In this way, the first part edge segment 21 is located halfway between the opposite ends 19, 20 of the edge segment 15.

Figure 5A:
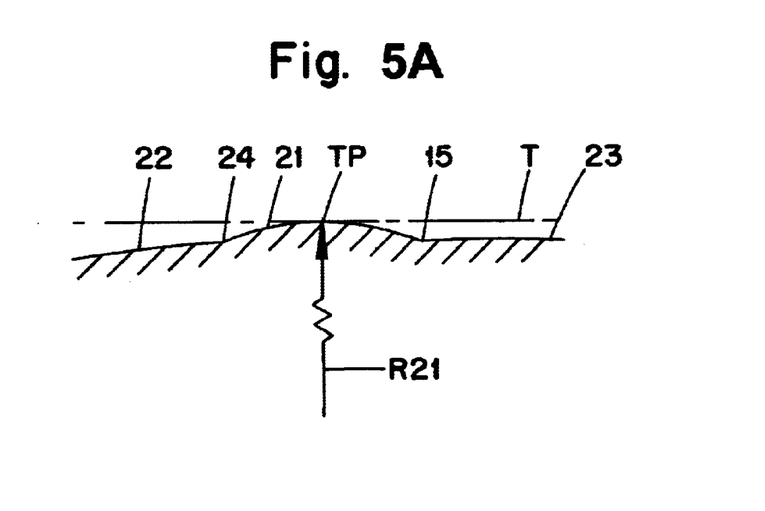
FIG. 5A is an enlarged fragmentary view of a portion of a smoothing edge segment of the insert of FIG. 5.

The part edge segment 21 forms the tangent point (TP) of the cutting insert against the workpiece, i.e. the point on the cutting edge which is absolutely closest the rotation axis C of the workpiece. Because the radius $R_{21}$ is smaller than the radii $R_{22}$ and $R_{23}$, the part edge segment 21 will (on a microscopic scale) project like a tappet from the surrounding, flatter part edge segments 22, 23. Therefore, irrespective of minor maladjustments of the cutting insert, the tangent point TP will be located at a predetermined, not variable distance from the end point 19 as well as from the end point 20. As shown in FIG. 5, an imaginary line U extends transversely to the tangent line T, which line T is tangent to the part edge segment 21 and parallel to the workpiece axis. (see FIGS. 5 and 5A). The line U intersects both the end point 19 and the geometric center of the transition edge segment 16 (i.e., the origin of the radius $R_{16}$, which radius determines the shape of the transition segment 16 between the edge segments 12 and 15. The angle ∝ between the lines T and U should, according to a preferred embodiment of the invention, be less than 90°. In practice, the angle may be within the range of 86–89° and conveniently amount to approximately 88°.

Below, examples of specific dimensions of the radii that define the different edge segments follow. When $R_{12}$ is 1.6 mm, $R_{16}$ may be 0.8 mm. $R_{21}$ may amount to 5 mm, while $R_{22}$ as well as $R_{23}$ may amount to 30 mm. Furthermore, $R_{17}$ may be 4 mm and $R_{14}$ may be infinity.

Reference is now made to FIGS. 6 and 7, which illustrate the difference of surface finish between conventional cutting inserts and the cutting insert according to the invention. In FIG. 6, it is illustrated how the tangent point TPa on a surface smoothening edge segment of a cutting insert according to prior art may move between a depth (in the workpiece) defined by the ideal tangent line Ta to a second depth defined by the line V that gives rise to a considerable ridge Y between nearby, concave bottoms in the machined surface. The difference $H_1$ between these depths may amount to 0.05 mm or more.

In the cutting insert according to the present invention, the difference $H_2$ between the maximum and minimum depth of tangent point TP, i.e. the edge part segment 21, amounts to merely approx. 0.008 mm (see FIG. 7). Thus, the fact that the edge part segment 21 always preserves a well-defined location along the surface smoothening edge segment 15 implies a considerable enhancement of the surface finish. This effect may, per se, be utilized merely to improve the surface finish, but a much more interesting possibility in practice is to increase the feeding "f" with retention of previously acceptable surface finish. Thus, performed experiments has shown that the feeding of a given cutting insert may be increased from the conventional 0.6 or 0.7 mm/rev to a greater rate of 1.0–1.2 mm/rev or more without the surface finish being deteriorated. To be able to increase the feeding by 50–100% with retained surface finish in this way of course implies a considerable reduction of the machining times and a radical enhancement of the strength and performance of the cutting insert.

Figure 8:
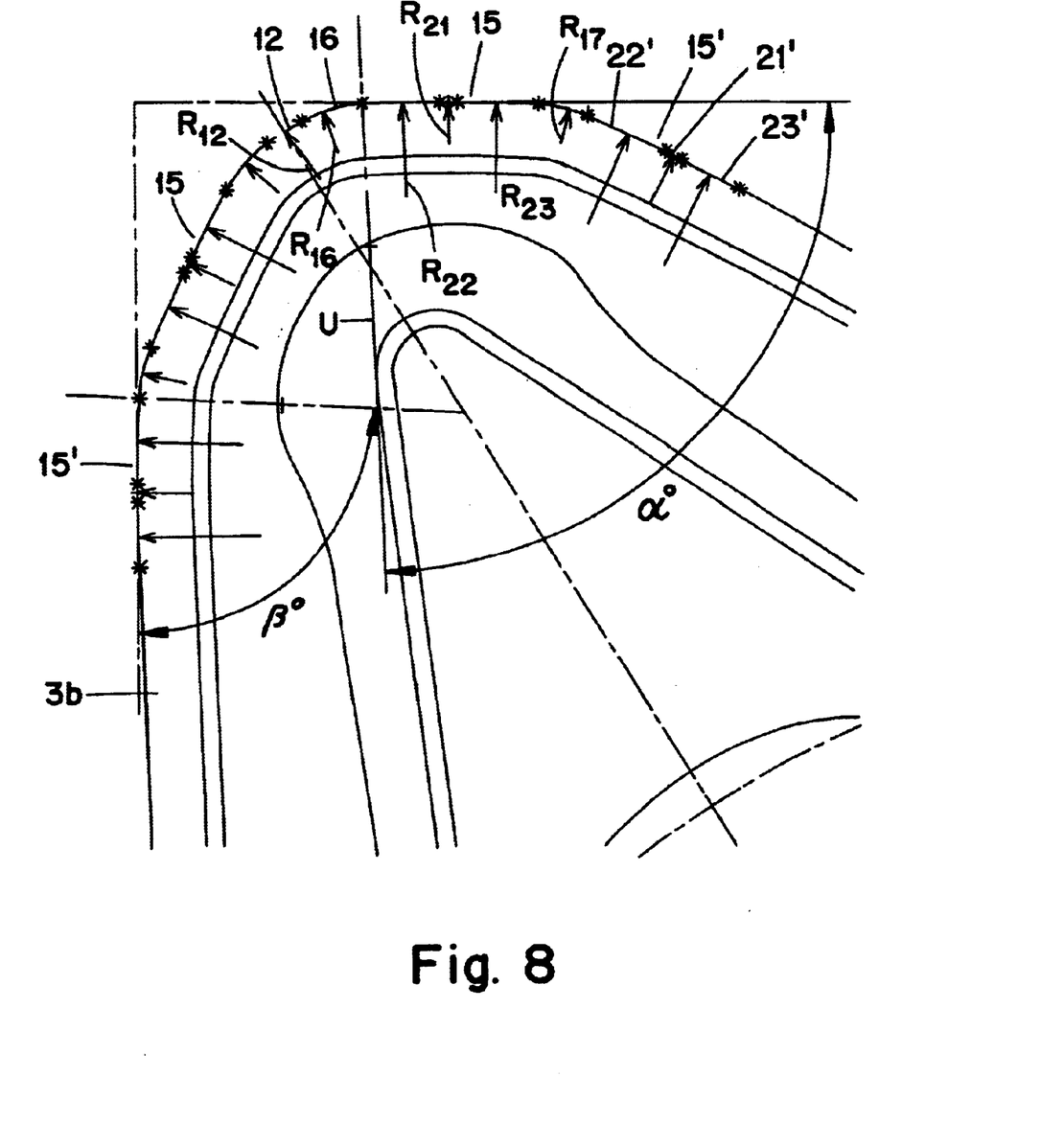
FIG. 8 is a view corresponding to FIG. 5 showing an alternative insert nose according to the invention.

In FIG. 8, an alternative embodiment of a nose in a polygonally shaped cutting insert 3*b* according to the invention is shown. In this case, the different edge segments and edge part segments have the following radii: $R_{12}$=1.6, $R_{16}$=0.8 mm, $R_{22}$=12 mm, $R_{21}$=4 mm, $R_{23}$=12 mm, $R_{17}$=0.8 mm. In the example, a secondary edge segment 15' with smoothening function is formed on the same side of the actual nose edge segment 12 as the smoothening edge segment 15, which like the edge segment 15 is divided into three different part edge segments 22', 21' and 23', having the same radii $R_{22}$, $R_2$, and $R_{23}$.

On the other side of the edge segment 12, there are two similar edge segments, 15 and 15', respectively. Also in this case, the angle $\alpha$ may amount to 88°, while the corresponding angle $\beta$ on the part of the cutting insert that is shown to the left in FIG. 8 may be smaller, e.g. 87°.

Figure 9:
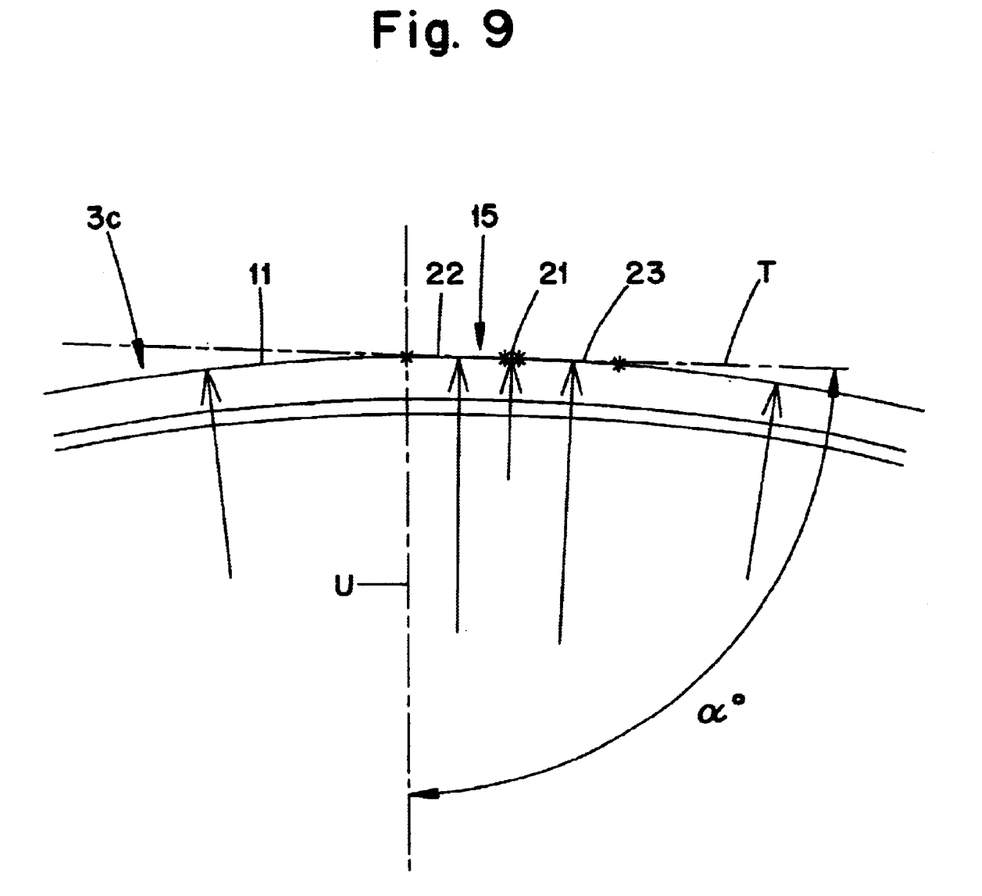
FIG. 9 is a detailed enlargement showing a circular cutting insert.
Figure 10:
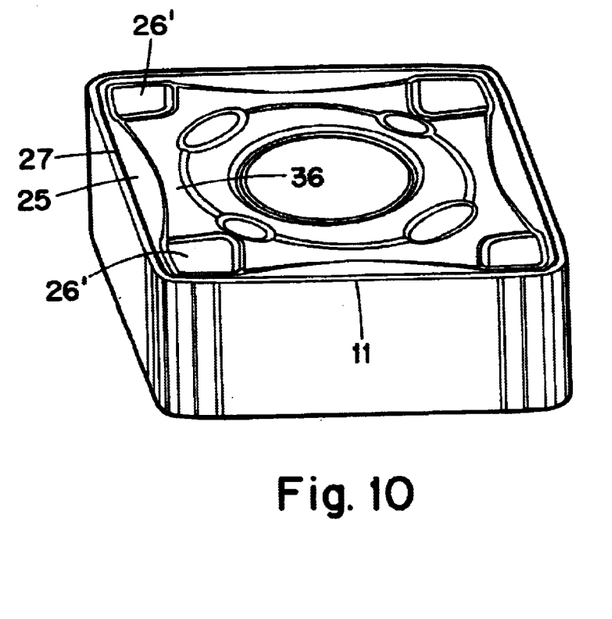
FIG. 10 is a perspective view of an alternative cutting insert according to the invention.
Figure 11:
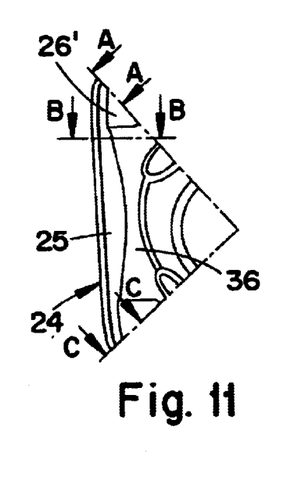
FIG. 11 is a partial, sector-like view from above of the cutting insert according to FIG. 10, whereby the location of three different sections A—A, B—B and C—C, are illustrated in the figure.

In FIG. 9, a round (circular or elliptical) cutting insert 3*c* is schematically exemplified. Along the continuous, substantially circular (or elliptical) edge 11 of the cutting insert, there is an edge segment 15 having the same design as in the preceding examples. In other words, the edge segment 15 is divided into three different part edge segments 21, 22, 23, the first-mentioned one of which has a smaller diameter and is shorter than both of the surrounding part edge segments 22, 23. Also in this case, the angle $\alpha$ between the tangent line T and a line U which intersects a point in the transition between the edge 11 and the part edge segment 22, is smaller than 90°, e.g. 88°.

It should also be mentioned that the flank surfaces 9 of the cutting insert (see FIG. 2 again) may be either neutral, i.e. extend perpendicularly to an imaginary reference plane halfway between the top and bottom sides of an insert of uniform thickness, or positive, i.e. extend at an acute angle inwards from the cutting edge 11. In double-sided cutting inserts, the flank surfaces 9 are usually neutral, while single-sided cutting inserts at times have a positive clearance geometry.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Cutting insert for chip removing machining of workpieces, comprising a body having opposite first and second surfaces interconnected by at least one side surface, wherein with the insert in an operative cutting state, the first and second surfaces form a chip removing top flank surface and an inactive bottom flank surface, respectively; the top flank surface forming a cutting edge with the side surfaces; a cutting geometry surface extending from the cutting edge and including a primary chamfer extending from the cutting edge and transforming into a chip removing surface, the chip removing surface being inclined in a downwards and inwards direction and transforming into a chip deflection surface for initiating deflection of a chip; the chip deflection surface forming an angle with a center reference plane extending parallel to the top and bottom surfaces, the angle being no greater than 18 degrees; a difference in elevation between the chip deflection surface and a highest point of the primary chamfer being no greater than 0.20 mm.

2. The cutting insert according to claim 1 wherein the angle is in the range of 3–18 degrees.

3. The cutting insert according to claim 2 wherein the angle is in the range of 10–15 degrees.

4. The cutting insert according to claim 1 wherein the difference in elevation is in the range of 0.06–0.16 mm.

5. The cutting insert according to claim 1 wherein the difference in elevation is in the range of 0.090–0.125 mm.

6. The cutting insert according to claim 1 wherein the chip deflection surface comprises a bottom surface which transforms into a plane land through a concavely curved chip breaking surface; the plane land extending towards a center of the cutting insert and located at an elevation between an elevation of the chip deflection surface and an elevation of a highest point of the primary chamfer.

7. The cutting insert according to claim 5 wherein a difference in elevation between the land and the highest point of the primary chamfer is greater than a difference in elevation between the land and the deflection surface.

8. The cutting insert according to claim 1 wherein the chip deflection surface comprises a plane land which transforms into a deeper-situated bottom surface.

9. The cutting insert according to claim 1 wherein each of the top and bottom flank surfaces forms a cutting edge with the side surfaces, at least one projection having a plane abutment surface projecting above a plane that extends parallel to the reference center plane and intersects the primary bevel.

10. The cutting insert according to claim 1 wherein the primary chamfer, the chip removing surface, and the chip deflecting surface extend smoothly continuously in the absence of abrupt projections.

11. The cutting insert according to claim 1 wherein the cutting edge includes a surface-smoothing segment for smoothing a cut surface of the workpiece; the surface-smoothing segment including at least first, second, and third part edge segments defined by first, second and third radii, respectively; the first part edge segment disposed between the second and third part edge segments; each of the second and third radii being longer than the first radii.

12. The cutting insert according to claim 10 wherein there are a plurality of side surfaces providing the insert with a polygonal shape; adjacent ones of the side surface being interconnected by a convexly curved corner along which a curved portion of the cutting edge extends; the curved portion of the cutting edge including a convexly curved first edge segment defining a nose intersected by an imaginary bisector of the corner, a second edge segment located on a first side of the bisector, a third edge segment disposed on a second side of the bisector, and a fourth edge segment disposed between the first and third edge segments and constituting the surface-smoothing segment.

13. The cutting insert according to claim 12 wherein each of the second and third radii is at least three times greater than the first radius.

14. The cutting insert according to claim 13 wherein each of the second and third radii is from 5 to 10 times greater than the first radius.

15. The cutting insert according to claim 13 wherein the surface-smoothing segment has opposite ends; the second and third part edge segments being of equal length wherein the first part edge segment is located halfway between those opposite ends.

16. The cutting insert according to claim 15 wherein the first part edge segment has a length in the range of 1 to 15% of a length of the surface-smoothing.

17. The cutting inset according to claim 16 wherein the range is from 5 to 10%.

* * * * *